United States Patent [19]

Shimazaki

[11] Patent Number: 5,335,096
[45] Date of Patent: Aug. 2, 1994

[54] METHOD AND APPARATUS FOR PROCESSING IMAGES

[75] Inventor: Osamu Shimazaki, Kanagawa, Japan

[73] Assignee: Fuji Photo Film Co., Ltd., Kanagawa, Japan

[21] Appl. No.: 70,805

[22] Filed: Jun. 3, 1993

[30] Foreign Application Priority Data

Jun. 5, 1992 [JP] Japan .................. 4-145613

[51] Int. Cl.$^5$ .................. G03F 3/08; H04N 1/46
[52] U.S. Cl. .................. 358/518; 358/504; 358/501
[58] Field of Search ........... 358/500, 501, 504, 505, 358/506, 518, 519, 523, 527, 401, 406, 487

[56] References Cited

U.S. PATENT DOCUMENTS

| 4,037,249 | 7/1977 | Pugsley | 358/504 |
| 4,751,377 | 6/1988 | Ishizaka et al. | 358/406 |
| 4,766,503 | 8/1988 | Lambert et al. | 358/518 |
| 4,970,584 | 11/1990 | Sato et al. | 358/518 |
| 5,003,379 | 3/1991 | Moore, Jr. | 358/527 |

FOREIGN PATENT DOCUMENTS

WO9110316 11/1991 PCT Int'l Appl.

Primary Examiner—Edward L. Coles, Sr.
Assistant Examiner—Thomas D. Lee
Attorney, Agent, or Firm—Sughrue, Mion, Zinn, Macpeak & Seas

[57] ABSTRACT

The spectral density and primary color density in each color-step region of a calibration chart made of a color photosensitive material is measured by a spectrodensitometer and an image reading apparatus, respectively. Then, a conversion data is obtained from the resultant data. The color density data obtained from the original made of the same color photosensitive material as that of the calibration chart are converted using the conversion data into the corresponding color dye quantity data. The spectral density characteristics of respective color dyes included in the color photosensitive material used for the original are applied to the converted color dye quantity data to obtain a composite density. Finally, the color space data of a desired colorimetric system is determined based on the composite density.

9 Claims, 7 Drawing Sheets

METHOD AND APPARATUS FOR PROCESSING IMAGES

BACKGROUND OF THE INVENTION

1. Field of the invention

This invention relates to a method and an apparatus for processing images for use in an image reading apparatus, wherein color space data of a desired colorimetric system can be stably obtained from image information carried by an original.

2. Description of the Related Art

In order to simplify work steps and improve quality of images in the production of a master film in the printing and platemaking field, for example, there is widely used an image scanning, reading and reproducing system which electrically processes image information recorded in an original.

In an image reading apparatus of the image scanning, reading and reproducing system, the original accommodated and positioned in an original cassette is transferred to a reading unit, and image information borne by the original is photoelectrically read there by CCDs or the like.

It is impossible, by the way, to accurately reproduce the image information recorded in the original without any calibration of the image reading apparatus in use, because the characteristic of an optical system in the reading unit is generally different from apparatus to apparatus.

As a calibration method to be easily thought of, there may be raised a direct mapping method. In the direct mapping method, standard data is first obtained by reading with a spectrodensitometer a chart on which standard brightness, chroma and hue are shown stepwise. Then, a conversion table is prepared for converting density data obtained by reading the chart with an image reading apparatus into corresponding standard data. Thus, the calibration of image data obtained from a desired original is enabled by the conversion table. Here, image data having the densities falling between respective steps of the chart is calibrated by interpolation, optimization, etc.

In order to obtain a highly accurate image data by the direct mapping method referred to above without relying on the interpolation or the like, it is necessary to use a chart having as many steps as possible. If dust, scratch, etc. is at even one point of the chart, an improper conversion table can be produced, which makes it impossible to obtain desired image data. It is actually impossible, on the other hand, to read all of the many steps on the chart by the spectrodensitometer with a high accuracy. As a result, an unnatural image is sometimes reproduced from the calibrated image data.

SUMMARY OF THE INVENTION

The present invention has been made to solve the foregoing problem. Namely, the object of the present invention is to provide a method and an apparatus for obtaining desired colorimetric data of an image read from an original and highly accurately calibrated, to make a reproduced image of a good quality therefrom.

According to one aspect of the present invention to achieve the above object, there is provided a method of processing in an image reading apparatus an image carried by a desired original made of a color photosensitive material, comprising the steps of:

preparing a calibration chart comprising at least three regions therein and made of said color photosensitive material, each of said regions having one of the three primary colors developed by respective color dyes of the color photosensitive material;

measuring the spectral density of said calibration chart by a spectrodensitometer to determine the quantities of the respective color dyes in each of said regions;

reading said calibration chart by said image reading apparatus to determine the density of the primary color in each of said regions;

producing conversion data for converting primary color densities into corresponding color dye quantities by correlating the densities of the primary color and the quantities of the respective color dyes obtained from said calibration chart;

reading said original by said image reading apparatus to determine the respective primary color densities in said original;

converting said primary color densities obtained from said original into the corresponding color dye quantities by said conversion data;

obtaining a composite density from the converted color dye quantities in said original by applying thereto spectral density characteristics of said color photosensitive material; and determining color space data of a desired colorimetric system from said composite density.

According to another aspect of the present invention, there is provided an apparatus for processing an image carried by a desired original made of a color photosensitive material, comprising:

dye quantity data storing means for storing therein dye quantity data in respective regions of a calibration chart, said calibration chart being made of said color photosensitive material and having at least three regions each having one of the three primary colors developed by respective color dyes;

a reader for reading said calibration chart and said original to obtain respective primary color densities;

conversion data computing means for computing conversion data from the dye quantity data stored in said dye quantity data storing means and the primary color densities obtained from said calibration chart, said conversion data being for converting primary color densities obtained from the original into corresponding dye quantities;

spectral density characteristics storing means for storing therein spectral density characteristics of respective color dyes in said color photosensitive material; and color space data computing means for converting said primary color densities in said original into the corresponding dye quantities by said conversion data, obtaining a composite density from the converted dye quantities in said original by applying thereto the stored spectral density characteristics of the color photosensitive material, and determining color space data of a desired colorimetric system from said composite density.

In the method of and the apparatus described above, the spectral density and primary color density in each region of the calibration chart is measured by the spectrodensitometer and the image reading apparatus, respectively. Then, the conversion data is obtained from the resultant data. The color density data obtained from the original are converted using the conversion data into the corresponding color dye quantity data, The spectral density characteristics of the respective dyes in the color sensitive material are applied to the converted color dye quantity data to obtain the composite density. Finally, the color space data of a desired colorimetric system is determined based on the composite density.

In the above method and apparatus, the image data are smoothed based on the spectral density characteristics of the respective color dyes. Therefore, each of the image data is not greatly shifted from the spectral density of the calibration chart, which is defined as the standard. Thus, the color space data in an extremely high accuracy can be obtained.

DETAILED DESCRIPTION OF THE PREFERRED EMBODIMENTS

A method and an apparatus for processing an image according to the present invention will hereinafter be described in detail with reference to the accompanying drawings in which a preferred embodiment is shown by way of illustrative example.

Figure 2:
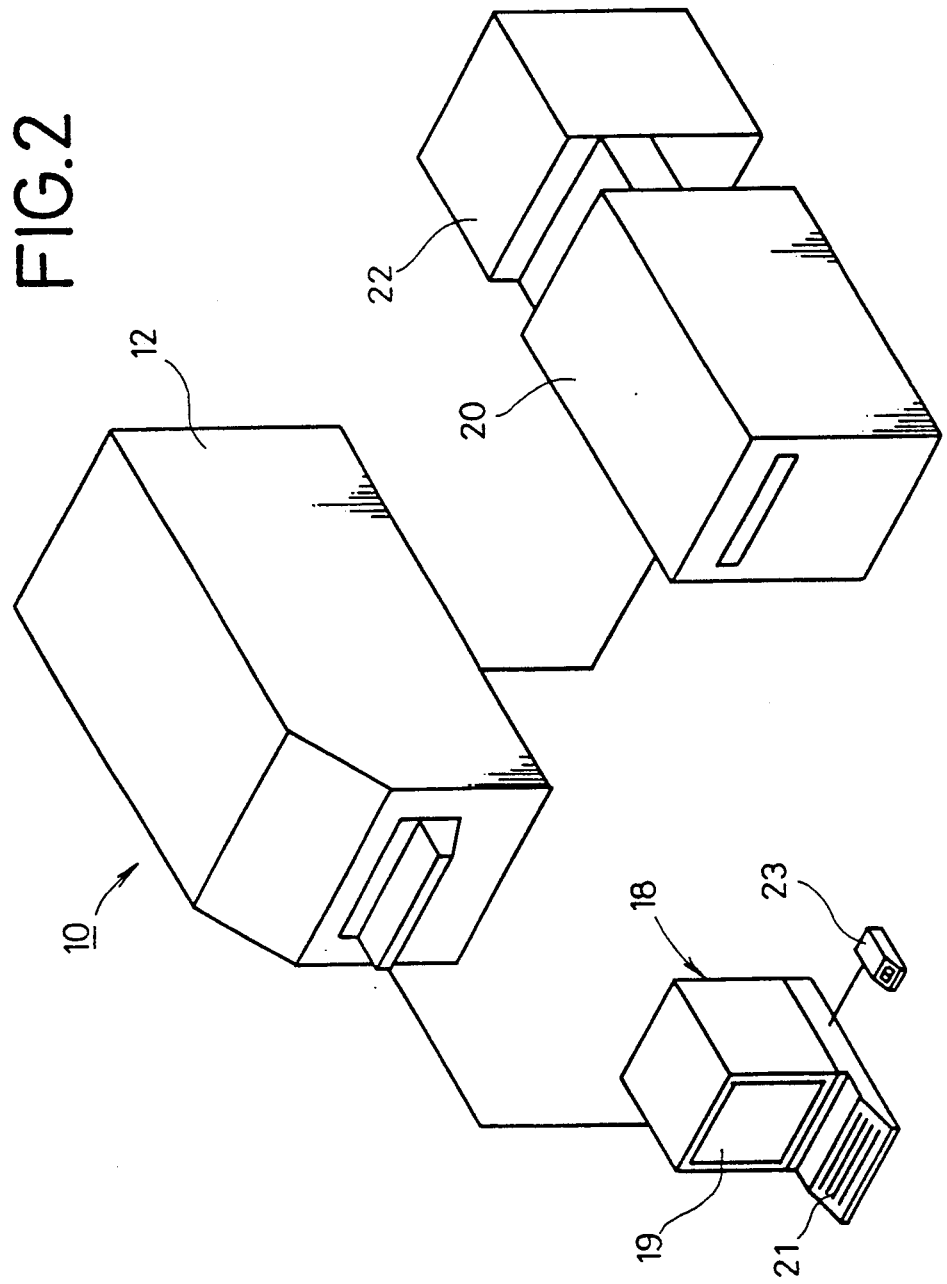
FIG. 2 is a view illustrating the structure of an image processing system to which the method and apparatus shown in FIG. 1 are applied.

FIG. 2 shows the overall structure of an image processing system 10 to which a method and an apparatus for processing an image according to the present invention is applied. The image processing system 10 basically comprises an image reading apparatus 12 for reading image information recorded on a light-transmissive original S to be scanned or read, which is held in an original cassette 14 (see FIG. 3), a console 18 for controlling the image reading apparatus 12, an image output apparatus 20 for reproducing and outputting the image information read by the image reading apparatus 12 onto a film, and an automatic developing apparatus 22 for developing the film so as to produce separation master films. Incidentally, the console 18 has a CRT display 19 for displaying image information or the like thereon, a keyboard 21 and a mouse 23.

Figure 3:
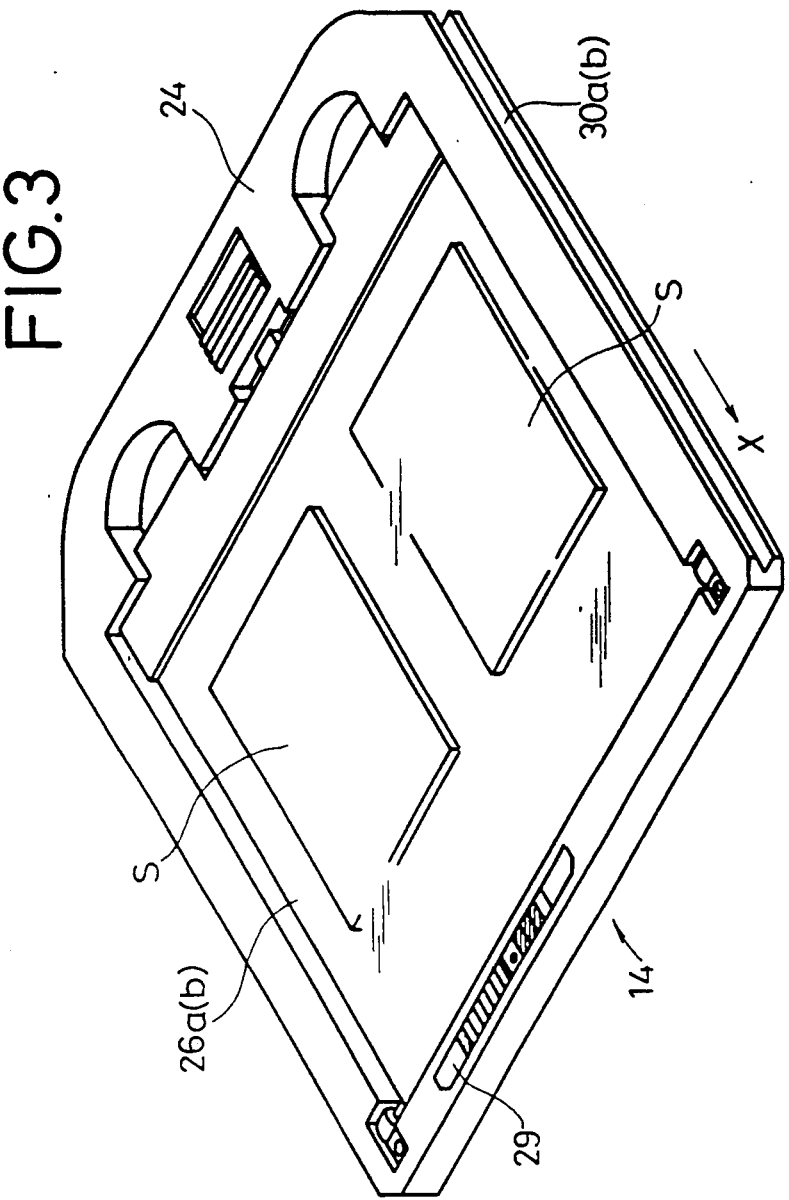
FIG. 3 is a perspective view showing an original cassette loaded into an image reading apparatus shown in FIG. 2.

The original cassette 14 shown in FIG. 3 is so constructed that the light-transmissive original S with the image information recorded thereon is held between two support glass panels 26a and 26b surrounded by a frame 24 shaped substantially in the form of a square. V-shaped grooves 30a and 30b, which extend along a feeding direction, are defined in opposite sides of the frame 24, which extend, for auxiliary reading, in a direction (i.e., in the direction indicated by the arrow X) to feed the original cassette 14 to the image reading apparatus 12. A cassette identifying device 29 for identifying the original cassette 14 is disposed on an upper surface of the leading end of the frame 24, which extends in the original cassette feeding direction. Incidentally, FIG. 3 shows the case where the two originals S are set. However, the number of the originals S may be set to one or six, for example, according to the size of each original S.

Figure 4:
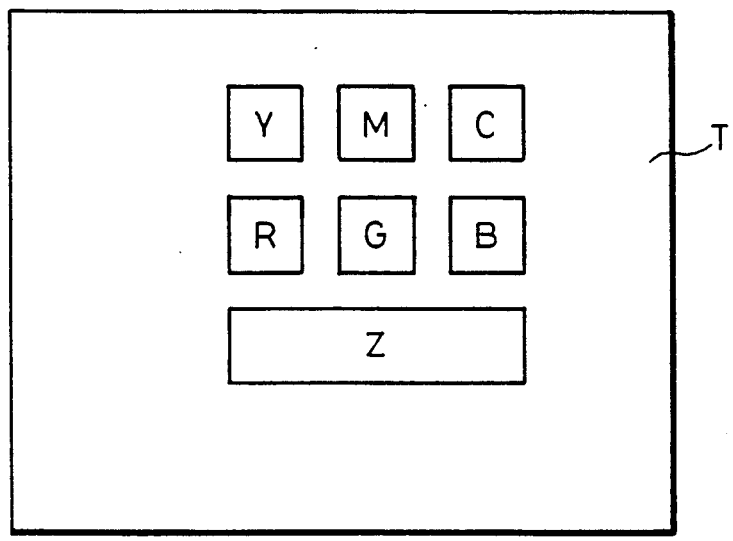
FIG. 4 is a view showing the structure of a calibration chart used for calibrating the image reading apparatus depicted in FIG. 2.

FIG. 4 shows a calibration chart T for calibrating characteristics of an optical system or the like employed in the image reading apparatus 12 to obtain image data regardless of the apparatus. The calibration chart T, made of a color photosensitive material having a color-developing characteristic identical to that of the original S, is held in the original cassette 14 and inserted into the image reading apparatus 12. The calibration chart T has color steps Y, M, C, R, G and B formed by developing primary color dyes and a color step Z of a film base which constitutes the calibration chart T.

Figure 5:
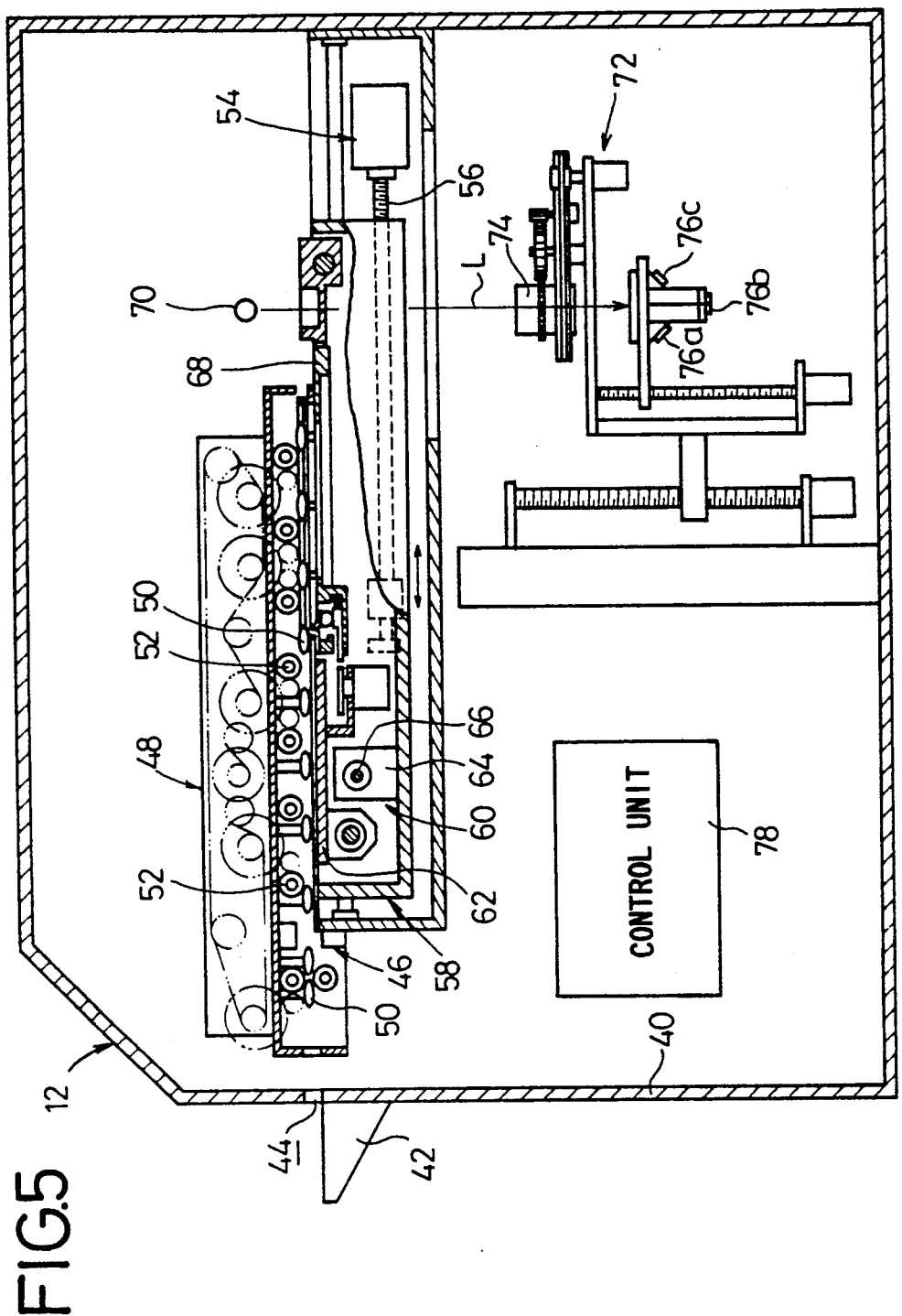
FIG. 5 is a cross-sectional view illustrating the image reading apparatus shown in FIG. 2.

FIG. 5 shows the structure of the inside of the image reading apparatus 12. The image reading apparatus 12 has an aperture 44 provided with a cassette insertion table 42 in front of a casing 40 and is so constructed that the original cassette 14 can be inserted through the aperture 44. A cassette identifying sensor 46 is provided inside the casing 40 closely to the aperture 44.

On the other hand, one end of a feed mechanism 48 is provided adjacent to the cassette identifying sensor 46, whereas the other end thereof extends to a position above a turntable 68 to be described later. The feed mechanism 48 has a plurality of guide rollers 50, which are held in point-to-point contact with the V-shaped grooves 30a and 30b of the original cassette 14, and a plurality of feed rollers 52 which are brought into contact with a feed surface of the frame 24 of the original cassette 14. The original cassette 14 is fed in a desired direction by the feed rollers 52.

An original table 58, which is movable back and forth in the auxiliary reading direction (i.e., in the direction indicated by the arrow X) by a motor 54 of an auxiliary reading feed mechanism through a ball screw 56, is disposed below the feed mechanism 48. The original table 58 has a trimming mechanism 60 for moving the original cassette 14 back and forth through a trimming table 62 along a trimming direction, i.e., along a direction perpendicular to the auxiliary scanning direction (i.e., in the direction indicated by the arrow X). The trimming mechanism 60 has a motor 64 mounted on the original table 58, which is activated so as to move the trimming table 62 back and forth through a ball screw 66. The turntable 68 is mounted to the trimming table 62 and supports thereon an unillustrated rotary mechanism for rotating the original cassette 14 through a predetermined angle with respect to the trimming table 62.

A light source 70, which constitutes an illuminating mechanism, is disposed within the casing 40. Further, an image reading unit 72 for photoelectrically reading or scanning illuminating light L, which is emitted from the light source 70 and has passed through the original cassette 14, is disposed below the light source 70. The image reading unit 72 has a converging lens 74 and a plurality of CCDs 76a through 76c for converting illuminating light L divided into light having respective wavelengths such as Y, M, C, etc. by a prism or the like into corresponding electric signals.

Figure 1:
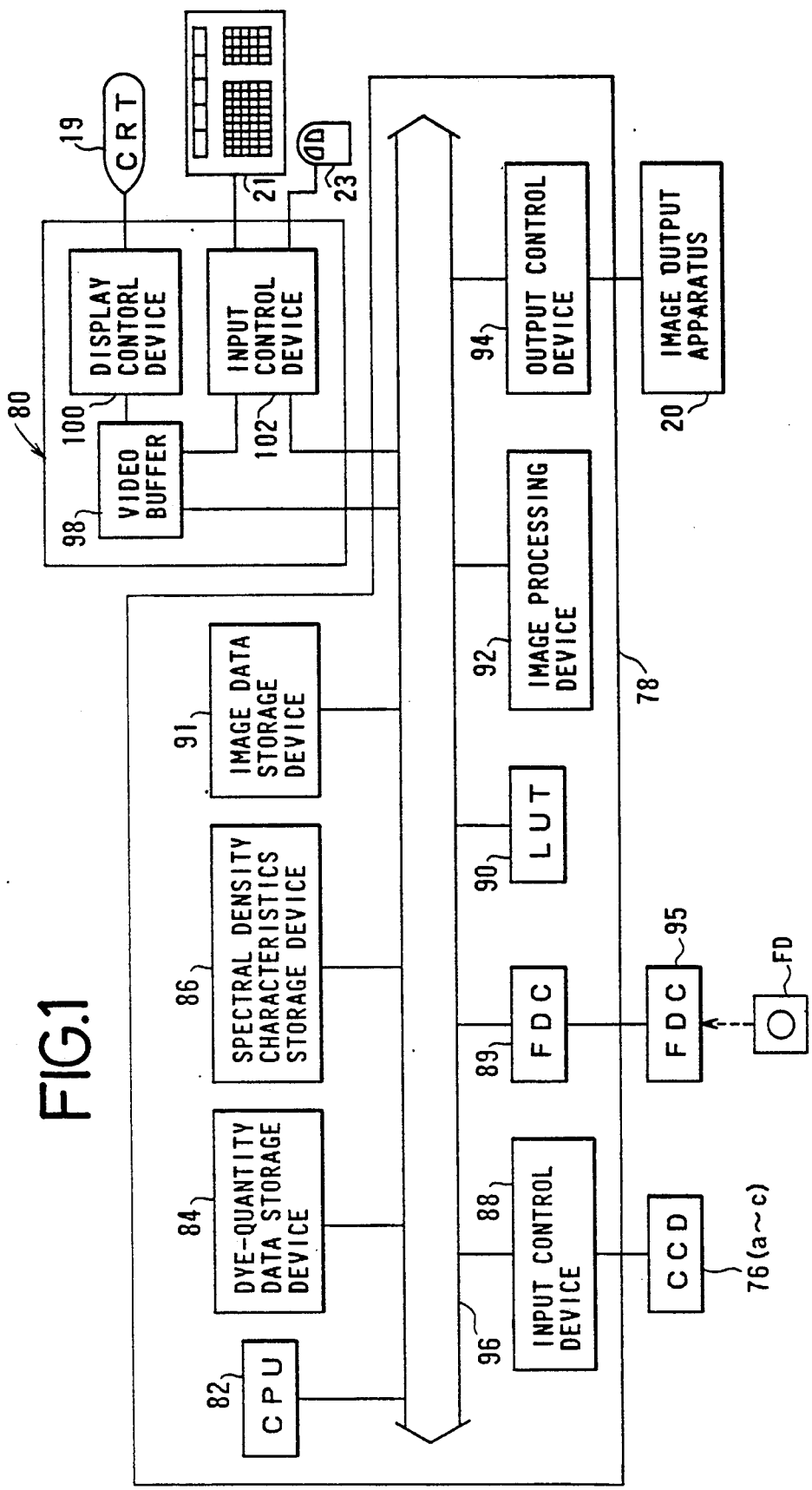
FIG. 1 is a block diagram showing the structure of a control unit of a system to which the method and apparatus of the present invention are applied.

FIG. 1 shows a block diagram which includes a control unit 78 for controlling the image reading apparatus 12 constructed as described above, and a control unit 80 of the console 18 electrically connected to the control unit 78. The control unit 78 comprises a CPU 82, a dye-quantity data storage device 84, a spectral density characteristics storage device 86, an input control device 88, an FD controller 89, a look-up table storage device 90 for storing conversion data therein, image data storage device 91 for storing image data therein, an image processing device 92 and an output control device 94, all of which are interconnected with each other through a bus 96.

The CPU 82 serves as a conversion data computing unit and a chromaticity data computing unit and generally controls the image reading apparatus 12. The dye-quantity data storage device 84 stores therein dye quantity data of respective color steps Y, M, C, R, G and B, which are obtained by reading the calibration chart T with a spectrodensitometer.

Figure 6:
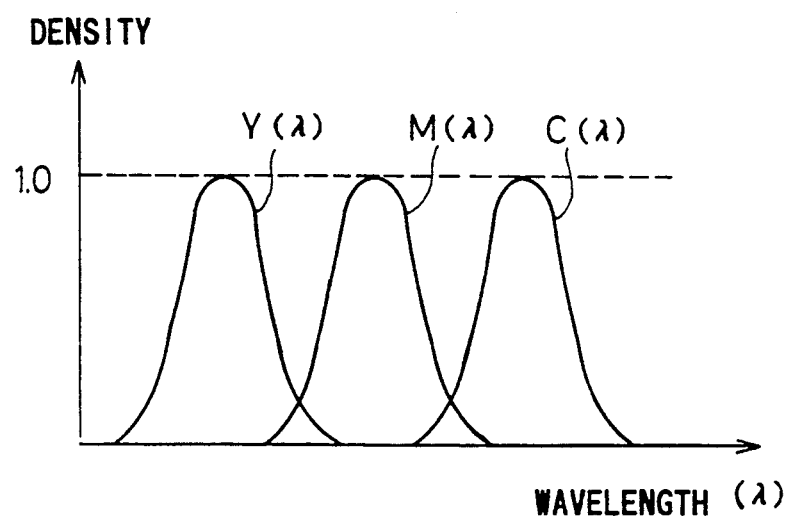
FIG. 6 is a view for describing spectral density characteristics of a color photosensitive material, which is applied to the image reading apparatus shown in FIG. 2.

The spectral density characteristics storage device 86 stores therein spectral density characteristic data $Y(\lambda)$, $M(\lambda)$ and $C(\lambda)$ each defined under the condition that the peak density of each color dye is taken as 1.0 and each dye is color-developed independently from others in the color photosensitive material constituting the calibration chart T which has the same color-developing characteristic as the original S (see FIG. 6).

The input control device 88 transfers image data supplied from the CCDS 76a through 76c to a predetermined processing device through the bus 96. The FD controller 89 controls an FD drive 95 in which a flexible disk FD is loaded.

The dye quantity data on the calibration chart T, which have been read and obtained by the spectrodensitometer and the spectral density characteristic data $Y(\lambda)$, $M(\lambda)$ and $C(\lambda)$ of the color photosensitive material are supplied from the flexible disk FD.

The look-up table storage device 90 stores a look-up table used for converting image data into chromaticity data of a desired colorimetric system.

The image processing device 92 effects a desired image process on the image information recorded on the original S and transmits the processed image information to the image data storage device 91 as desired image data. The output control device 94 outputs the image data stored in the image data storage device 91 to the image output apparatus 20.

The control unit 80 has a vide buffer 98, a display control device 100 and an input control device 102. The video buffer 98 stores therein data to be display on the CRT display 19. The display control device 100 displays the data stored in the vide buffer 98 on the CRT display 19 in accordance with an instruction inputted via the keyboard 21. Further, the input control device 102 is electrically connected with the keyboard 21 and the mouse 23 and transfers instruction data inputted by an operator to the CPU 82 of the control unit 78 via the bus 96.

Figure 7:
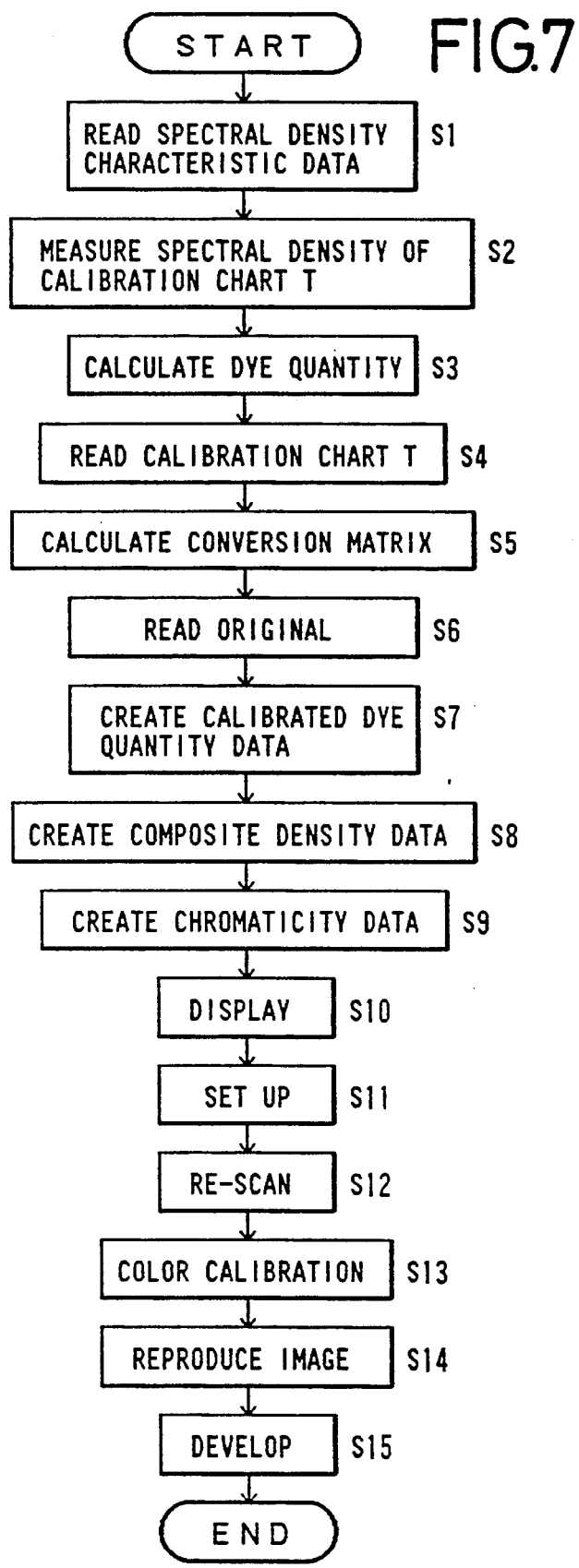
FIG. 7 is a flowchart for describing a sequential procedure for performing the image processing method according to the present invention.

A calibration method, which is effected using the calibration chart T under the control of the image processing system 10 constructed as roughly described above, will now be described in accordance with a flowchart shown in FIG. 7.

First, the spectral density characteristics $Y(\lambda)$, $M(\lambda)$ and $C(\lambda)$ of the color photosensitive material used in the originals S and the calibration chart T are measured for every dyes under the conditions that the peak density is taken as 1.0 as shown in FIG. 6. The so-determined spectral density characteristic data $Y(\lambda)$, $M(\lambda)$ and $C(\lambda)$ are stored in the flexible disk FD. The data are read by the FD drive 95 under the control of the FD controller 89 and stored in the spectral density characteristics storage device 86 via the bus 96 (Step S1).

Next, the peak spectral densities of respective color steps Y, M, C, R, G, B and Z on the calibration chart T are measured by the spectrodensitometer (Step S2). Further, values obtained by subtracting the spectral density of the color step Z of the film base constituting the calibration chart T from the spectral densities of the respective color steps Y, M, C, R, G and B are determined for every color steps Y, M, C, R and B.

Now, each of the color steps Y, M, C, R, G and B is not necessarily comprised of one of Y, M and C in a pure form. Even if the color step Y is selected for example, it often may include dyes of M and C. Thus, the quantity of dyes which constitute each of the color steps Y, M, C, R, G and B is determined as dye quantity data q based on the standard spectral densities (known) of the pure dyes of Y, M and C (Step S3).

The dye quantity data q determined in Step S3 are stored in the flexible disk FD and supplied to the image reading apparatus 12. The image reading apparatus 12 reads the dye quantity data q stored in the flexible disk FD through the FD drive 95 and stores it in the dye-quantity data storage device 84.

After the dye quantity data q have been stored in the dye-quantity data storage device 84, the original cassette 14 with the calibration chart T held therein is inserted into the image reading apparatus 12 through the aperture 44. When the original cassette 14 is inserted into the image reading apparatus 12, the cassette identifying sensor 46 first senses information set to the cassette identifying device 29 of the original cassette 14. It is thus determined that the calibration chart T has been held in the original cassette 14. Then, the original cassette 14 is guided by the guide rollers 50 which engage in the grooves 30a and 30b. In this condition, the original cassette 14 is fed to a predetermined position above the image reading unit 72 by the feed rollers 52 of the feed mechanism 48. Thereafter, the image reading unit 72 reads the calibration chart T (Step S4).

In the image reading unit 72 shown in FIG. illuminating light L emitted from the light source passes through the respective color steps Y, M, C, G, B and Z of the calibration chart T held in the original cassette 14 and is introduced into the respective CCDs 76a through 76c through the focusing lens 74. Each of the CCDs 76a through 76c converts the illuminating light L into an electric signal corresponding to each wavelength. The electric signal is supplied to the CPU 82 through the input control device 88 as density data d of each of the color steps Y, M, C, R, G and Z of the calibration chart T.

The CPU 82 calculates a conversion matrix $A_{3\times 6}$ for effecting a color separation calibration based on the density data d of the respective color steps Y, M, C, R, G and B, which have been obtained from the calibration chart T, and the dye quantity data q of the calibration chart T, which have been stored in the dye quantity data storage device 84 in advance (Step S5). Incidentally, $A_{3\times 6}$ represents a 3-row and 6-column matrix.

Now, the image reading unit 72 reads as data respective color steps Y, M, C, R, G, B and Z of the calibration chart T at Y, M and C channels respectively corresponding to the CCDs 76a through 76c. Then, data obtained by subtracting the data about the color step Z of the film base constituting the calibration chart T from the read data is determined as density data d. In the following description, either the channel or dye will be represented below by a subscript of a small letter and the color step will be represented below by a subscript of a capital letter as in the case where density data at the time that the color step M is read at the Y channel is represented as $d_{yM}$ and the dye quantity data about the color step M at the Y channel is represented as $q_{yM}$, for example.

Assuming now that the calibration terms including the secondary calibration term are used, a matrix $q_{3\times6}$ comprised of dye quantity data q obtained by the spectrodensitometer and a matrix $d_{6\times6}$ comprised of density data d obtained by the image reading unit 72 are given as follows:

$$q_{3\times6} = \begin{pmatrix} q_{yY} q_{yM} q_{yC} q_{yR} q_{yG} q_{yB} \\ q_{mY} q_{mM} q_{mC} q_{mR} q_{mG} q_{mB} \\ q_{cY} q_{cM} q_{cC} q_{cR} q_{cG} q_{cB} \end{pmatrix} \tag{1}$$

$$d_{6\times6} = \tag{2}$$

$$\begin{pmatrix} d_{yY} & d_{yM} & d_{yC} & d_{yR} & d_{yG} & d_{yB} \\ d_{mY} & d_{mM} & d_{mC} & d_{mR} & d_{mG} & d_{mB} \\ d_{cY} & d_{cM} & d_{cC} & d_{cR} & d_{cG} & d_{cB} \\ d_{yY}\cdot d_{mY} & d_{yM}\cdot d_{mM} & d_{yC}\cdot d_{mC} & d_{yR}\cdot d_{mR} & d_{yG}\cdot d_{mG} & d_{yB}\cdot d_{mB} \\ d_{mY}\cdot d_{cY} & d_{mM}\cdot d_{cM} & d_{mC}\cdot d_{cC} & d_{mR}\cdot d_{cR} & d_{mG}\cdot d_{cG} & d_{mB}\cdot d_{cB} \\ d_{cY}\cdot d_{yY} & d_{cM}\cdot d_{yM} & d_{cC}\cdot d_{yC} & d_{cR}\cdot d_{yR} & d_{cG}\cdot d_{yG} & d_{cB}\cdot d_{yB} \end{pmatrix}$$

Then, a conversion matrix $A_{3\times6}$ which satisfies the following equation is determined using the above equations.

$$q_{3\times6} = A_{3\times6}\cdot d_{6\times6} \tag{3}$$

The conversion matrix $A_{3\times61}$ can be determined from the equation (3) as follows:

$$A_{3\times6} = q_{3\times6}\cdot (d_{6\times6})^{-1} \tag{4}$$

The so-determined conversion matrix $A_{3\times6}$ is stored in the look-up table storage device 90 as data.

After the conversion matrix $A_{3\times6}$ has been determined in the above-described manner, the original cassette 14 with a desired original S to be scanned held therein is loaded into the image reading apparatus 12.

Incidentally, the original S is made of a color photosensitive material having a color-developing characteristic identical to that of the calibration chart T used when the conversion matrix $A_{3\times6}$ is set.

In a manner similar to the calibration chart T, the original cassette 14, which has been loaded into the image reading apparatus 12, is fed to the upper portion of the image scanning unit 72, where the image information recorded on the original S is read (Step S6). Then, density data corresponding to the image information obtained from the original S is supplied to the CPU 82 through the input control device 88.

The CPU 82 corrects the density data using the conversion matrix $A_{3\times6}$ stored in the look-up table storage device 90 to produce corrected dye quantity data (Step S7). When, in this case, the density data corresponding to the Y, M and C channels, which have been obtained from the original S, are represented as $d_y$, $d_m$ and $d_c$ respectively, the calibrated dye quantity data $q_y$, $q_m$ and $q_c$ are determined as follows (Step S7):

$$\begin{pmatrix} q_y \\ q_m \\ q_c \end{pmatrix} = A_{3\times6} \cdot \begin{pmatrix} d_y \\ d_m \\ d_c \\ d_y\cdot d_m \\ d_m\cdot d_c \\ d_c\cdot d_y \end{pmatrix} \tag{5}$$

In order to smooth the calibrated dye quantity data $q_y$, $q_m$ and $q_c$, the CPU 82 then calculates a composite density $D_{total}$ by applying the spectral density characteristic data $Y(\lambda)$, $M(\lambda)$ and $C(\lambda)$, stored in the spectral density characteristics storage device 86, to $q_y$, $q_m$ and $q_c$ according to the following equation (Step S8):

$$D_{total}(\lambda) = q_y\cdot Y(\lambda) + q_m\cdot M(\lambda) + q_c\cdot C(\lambda) \tag{6}$$

Further, the CPU 82 determines chromaticity data of a desired colorimetric system from the composite density data $D_{total}$ (Step S9). In an XYZ colorimetric system of CIE, for example, tristimulus values X, Y and Z are determined according to the following equations:

$$X = \int_{360nm}^{780nm} 10^{-D_{total}(\lambda)} \cdot \bar{x}(\lambda) d\lambda \tag{7}$$

$$Y = \int_{380nm}^{780nm} 10^{-D_{total}(\lambda)} \cdot \bar{y}(\lambda) d\lambda$$

$$Z = \int_{380nm}^{780nm} 10^{-D_{total}(\lambda)} \cdot \bar{z}(\lambda) d\lambda$$

(where $\bar{x}(\lambda)$, $\bar{y}(\lambda)$ and $\bar{z}(\lambda)$ are respectively isochromatic functions of CIE) Then, chromaticity data (x, y) are determined from the following equations using the tristimulus values X, Y and Z.

$$x = X/(X+Y+Z), \quad y = Y/(X+Y+Z) \tag{8}$$

In an $L^*a^*b^*$ colorimetric system as well, lightness index data $L^*$ and chromatocness data $a^*$ and $b^*$ are determined from the following equations: ps $$L^* = 116(Y/Yn)^{\frac{1}{3}} - 16$$

$$a^* = 500\{(X/Xn)^{\frac{1}{3}} - (Y/Yn)^{\frac{1}{3}}\} \tag{9}$$

$$b^* = 200\{(Y/Yn)^{\frac{1}{3}} - (Z/Zn)^{\frac{1}{3}}\{$$

(where Xn, Yn and Zn represent tristimulus values on a perfect diffuse surface under the same illumination as an object color having tristimulus values X, Y and Z, and Yn is normally standardized as 100 (Yn=100))

Incidentally, a colorimetric system other than the above, such as a $L^*u^*a^*$ colorimetric system may be used.

In the aforementioned process, color space data such as chromaticity data are determined by successively effecting the Steps S7 through S9. However, the data $L^*$, $a^*$ and $b^*$ may also be determined in the following manner. Namely, look-up tables $F_L$, $F_a$ and $F_b$ for determining the $L^*$, $a^*$, and $b^*$ are created and stored in the look-up table storage device 90 as data by using the conversion matrix $A_{3\times6}$, the spectral density characteristic data Y(λ), M(λ), C(λ) stored in the spectral density characteristics storage device 86, and the color space data conversion equations (7) through (9). In this situation, the L*, a* and b* may be determined from the following equations using the look-up tables $F_L$, $F_a$ and $F_b$.

$$L^* = F_L(q_y, q_m, q_c)$$
$$a^* = F_a(q_y, q_m, q_c) \quad (10)$$
$$b^* = F_b(q_y, q_m, q_c)$$

Further, the L*, a* and b* may also be determined in the following manner. Namely, look-up tables $G_L$, $G_a$ and $G_b$ for determining the L*, a* and b* based on the density data $d_y$, $d_m$ and $d_c$ are created by combining the above equations and the equation (5). Then, the L*, a* and b* may be determined from the following equation using the look-up tables $G_L$, $G_a$ and $G_b$.

$$L^* = G_L(d_y, d_m, d_c)$$
$$a^* = G_a(d_y, d_m, d_c) \quad (11)$$
$$b^* = G_b(d_y, d_m, d_c)$$

The color space data x, y or L*, a* and b*, which have been determined in the above-described manner, are invariant data which do not depend on the characteristics of the image reading apparatus 12. Therefore, for example, these data can be supplied to other processing device so as to output an image without any difference between respective devices. In this case, the image data is smoothed based on a spectral energy distribution in accordance with the equations (6) and (7) without being affected by dust, scratches, etc. which are developed when the calibration chart T and the original S are read. It is therefore possible to produce an image which has an extremely high accuracy.

In the image scanning apparatus 12 employed in the present embodiment, the image data obtained in the above-described manner is next temporarily stored in the image data storage device 91. Thereafter, the image data is displayed on the CRT display 19 by the control unit 80 (Step S10).

The operator sets up processing conditions based on the image displayed on the CRT display 19 (Step S11). Since the color-calibrated image is displayed, on the CRT display 19 in this case, the setup of the processing conditions can be accurately made. The processing conditions here represent those for creating desired master separation films.

These processing conditions can be classified into image reading conditions and image processing conditions. The image reading conditions show those such as selection of, for example, a region of an original S to be read (trimming), magnification, a turning angle at the time of reading of the original S, the kind of halftone at the time of halftoning, the number of lines on the screen, color separation (Y, M C, Bk) in a master separation film; a judgement as to whether borders (edges) of the master separation film have been set up; a judgment as to whether resist marks have been applied; and a judgment as to whether an exposure condition at the time of the color separation of the original S has been set up.

The image processing conditions represent such as the densities of highlights and shadows in the master separation film, setting-up of the dot percent, gradation, color correction and sharpness, undercolor removal, etc.

Next, the original cassette 14 in which the setup (Step S11) has been completed, is re-scanned (main-scanned) in the image reading unit 72 based on the given processing conditions (Step S12). Thereafter, the image information on the original S held in the original cassette 14 is subjected to color calibration in accordance with the same processes as those in Steps S7 through S9 (Step S13) and stored in the image data storage device 91 as main-scanned image data.

The main-scanned image data is then transferred to the image output apparatus 20, where it is converted into a light signal such as a laser beam. Thereafter, the light signal thus converted is reproduced on a film (Step S14) as an image. The film is transferred to the automatic developing apparatus 22, where it is in turn developed to produce a desired master separation film (Step S15).

According to the present invention, as has been described above, the spectral density of the calibration chart T is measured by the spectrodensitometer and read as data by the image reading apparatus. Then, conversion data is determined from the read data. Thereafter, desired color space data is determined based on the conversion data and the spectral density characteristics of the respective dyes in the color photosensitive material of the original. The color space data here is smoothed based on the spectral energy distribution upon its determination. Thus, even if errors caused by dust, scratches, etc. are produced in a portion of the density data obtained from the calibration chart, the image data are smoothed based on the spectral density characteristics of the dyes. It is therefore possible to obtain a highly accurate and smooth image. Since the image data is supplied as the color space data of the desired colorimetric system, widely-usable data which do not depend on the system, can be obtained.

Having now fully described the invention, it will be apparent to those skilled in the art that many changes and modification can be made without departing from the spirit or scope of the invention as set forth herein.

What is claimed is:

1. A method of processing an image carried by a desired original made of a color photosensitive material in an image reading apparatus, comprising the steps of:
    preparing a calibration chart comprising at least three regions therein and made of said color photosensitive material, each of said regions having one of the three primary colors developed by respective color dyes of the color photosensitive material;
    measuring the spectral density of said calibration chart by a spectrodensitometer to determine the quantities of the respective color dyes in each of said regions;
    reading said calibration chart by said image reading apparatus to determine the density of the color in each of said regions;
    producing conversion data for converting color density into corresponding color dye quantity by correlating the color densities and color dye quantities obtained from said calibration chart;
    reading said original by said image reading apparatus to determine the respective primary color densities in said original;
    converting said primary color densities in said original into the corresponding color dye quantities by said conversion data;

obtaining a composite density from the converted color dye quantities in said original by applying thereto spectral density characteristics of the color photosensitive material; and determining color space data of a desired colorimetric system from said composite density.

2. A method according to claim 1, wherein said color dye quantity in said calibration chart is determined from a peak spectral density in each region of said calibration chart.

3. A method according to claim 1, wherein said color dye quantity in said calibration chart is so determined that the color dye quantity in a film base constituting said calibration chart is subtracted.

4. A method according to claim 1, wherein said conversion data is a matrix $A_{3\times6}$ determined by:

$$A_{3\times6} = q_{3\times6} \cdot (d_{6\times6})^{-1},$$

wherein $q_{3\times6}$ is the color dye quantity data obtained for said calibration chart, represented by:

$$q_{3\times6} = \begin{pmatrix} q_yY & q_yM & q_yC & q_yR & q_yG & q_yB \\ q_mY & q_mM & q_mC & q_mR & q_mG & q_mB \\ q_cY & q_cM & q_cC & q_cR & q_cG & q_cB \end{pmatrix}$$

and $d_{6\times6}$ is the primary color density data obtained for the said calibration chart, represented by:

$$d_{6\times6} = \begin{pmatrix} d_yY & d_yM & d_yC & d_yR & d_yG & d_yB \\ d_mY & d_mM & d_mC & d_mR & d_mG & d_mB \\ d_eY & d_eM & d_eC & d_eR & d_eG & d_eB \\ d_yY \cdot d_mY & d_yM \cdot d_mM & d_yC \cdot d_mC & d_yR \cdot d_mR & d_yG \cdot d_mG & d_yB \cdot d_mB \\ d_mY \cdot d_eY & d_mM \cdot d_eM & d_mC \cdot d_eC & d_mR \cdot d_eR & d_mG \cdot d_eG & d_mB \cdot d_eB \\ d_eY \cdot d_yY & d_eM \cdot d_yM & d_eC \cdot d_yC & d_eR \cdot d_yR & d_eG \cdot d_yG & d_eB \cdot d_yB \end{pmatrix}$$

where subscripts of small letters on the matrix elements qs and ds represent color separation channels in the image reading apparatus or color dyes of y, m and c in the color photosensitive material, and subscripts of large letters represent color steps Y. M. C, R, G and B in the calibration chart.

5. A method according to claim 1, wherein said composite density is determined by:

$$D_{total}(\lambda) = q_y \cdot Y(\lambda) + q_m \cdot M(\lambda) + q_c \cdot C(\lambda),$$

where $D_{total}$ is the composite density, $q_y$, $q_m$ and $q_c$ are the color dye quantity and $Y(\lambda)$, $M(\lambda)$ and $C(\lambda)$ represent spectral density characteristics of primary color dyes Y, M and C in the color sensitive material with respect to the wavelength $\lambda$.

6. A method according to claim 1, wherein said color space data are of an XYZ colorimetric system.

7. A method according to claim 1, wherein said color space data are of an L*a*b* colorimetric system.

8. A method according to claim 1, wherein said calibration chart has respective color step regions of Y, M, C, R, G and B and a color step region indicative of the density of the base constituting said calibration chart.

9. An apparatus for processing an image carried by a desired original made of a color photosensitive material, comprising:

dye quantity data storing means for storing therein color dye quantity in respective regions of a calibration chart, said calibration chart being made of said color photosensitive material and having at least three regions each having one of the three primary colors developed by respective color dyes of the color photosensitive material;

a reader for reading said calibration chart and said original to obtain respective primary color densities;

conversion data computing means for obtaining conversion data from the dye quantity data stored in said dye quantity data storing means and the primary color densities read from said calibration chart, said conversion data being for converting primary color densities obtained from the original to corresponding color dye quantities;

spectral density characteristics storing means for storing therein spectral density characteristics of respective color dyes of said color photosensitive material;

color space data computing means for converting said primary color densities obtained from said original into the corresponding color dye quantities by said conversion data, obtaining a composite density from the converted dye quantities of said original by applying thereto the stored spectral density characteristics of the color photosensitive material, and determining color space data of a desired colorimetric system from said composite density.

* * * * *